Patented May 12, 1942

2,282,781

UNITED STATES PATENT OFFICE 2,282,781

IMITATION OLIVE OIL

Sidney Musher, New York, N. Y., assignor to Musher Foundation Incorporated, New York, N. Y., a corporation of New York No Drawing. Application August 13, 1941, Serial No. 406,649

9 Claims. (Cl. 99—123)

The present invention relates to the development of improved olive infused and olive oil blended glyceride oils having an enhanced and greatly improved olive flavor and taste.

According to the present invention, glyceride oils, and particularly refined cottonseed, corn, soya bean and peanut oils, are given novel flavor and odor characteristics together with improved stability and resistance to rancidity and oxidative deterioration by infusion of such oils with macerated olive pastes.

The olive pastes are made from olives which have been picked in substantially ripe condition and before any fermentation has set in. The ripe olives are preferably in salted and dehydrated condition and are macerated to produce a paste which is used for the infusion procedure, and by the infusion process, the oils, such as refined corn oil, develop an unusual and most valuable olive and olive oil flavor.

It has also been found possible to use olives in substantially green, unripe and bitter condition together with or in lieu of the ripe olives for preparation into a paste and for infusion in vegetable seed and nut as well as in refined white mineral oil.

It has, however, been found that in many instances the olive flavor and odor characteristics of the infused oils are not as fully developed in the refined deodorized seed and nut oils as is desired.

As a result, it is often necessary in some instances to rerun these refined oils several times with the macerated olive pastes.

In other instances, it has been found necessary to treat them with larger amounts of olive paste in order to develop the desirable flavor and odor characteristics therein.

It is among the objects of the present invention, therefore, to enhance the development of olive oil flavor and odor characteristics in olive infused refined glyceride oils and particularly in olive infused refined corn oil, soybean oil, cottonseed oil and peanut oil and to assure that the development of the olive oil flavor will remain uniform from batch to batch without prolonged or repeated infusion procedures and without the use of relatively large amounts of the olive paste for infusion purposes.

Another object is to produce an improved olive infused glyceride oil and particularly an improved olive infused seed and nut oil which will have developed therein olive oil flavor and odor characteristics to a much higher degree than hitherto thought possible so as to be a true imitation of the finest imported virgin olive oils.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has now been found that the olive oil flavor and odor characteristics may be emphasized and enhanced in olive infused glyceride oils, particularly the refined deodorized seed and nut oils, by treating said oils, preferably in combination with the olive pastes, with a very small proportion of ground or macerated kernels, seeds or nuts of the drupe family such as bitter almonds, apricot kernels, peach kernels, plum kernels, cherry kernels, nectarine kernels, or apple seeds.

These drupe kernels are preferably finely ground or they may be combined with from ½ to 2 parts of an oil to each part of kernels and macerated or ground to form an oily paste.

The ground or macerated kernels are then combined with the olive paste which may be made from green or ripe olives and which may or may not have been salted and/or dehydrated, and with or without added oil to provide an oily paste, the kernels being present in an amount of between 0.25% and 7.5% against the weight of the olive paste.

It has been found preferable, however, to use between 1% and 4% of the drupe kernels, such as bitter almonds, for incorporation with the olive paste, particularly where the moisture content of the olive paste ranges between 30% and 55%.

Where the moisture content of the olive paste is less than about 30%, the amount of drupe kernels is increased to over 4% and where the moisture content of the paste is over 55%, the drupe kernels are reduced to under about 2%.

In those cases where the olives are fully and completely dried before preparation into paste form, it may even be desirable to add 5% to 25% by weight of water to the paste and in these cases, it has been found preferable to use brine, desirably concentrated salt brine, rather than water alone.

The olive paste containing the drupe kernels is desirably not used for at least 2 to 3 days for infusion purposes and is then ready for addition to and infusion in the glyceride oil or refined white mineral oil.

Among the oils that may particularly be employed for infusion with the combination of olives and drupe kernels thus prepared are the glyceride oils and including particularly the refined deodorized glyceride oils, such as corn oil, cottonseed oil, soyabean oil, sesame oil, peanut oil and olive oil, all in refined deodorized condition.

By a refined oil is meant an oil which has been subjected to the usual refining processes that may include causticizing and high temperature deodorization with or without bleaching and winterizing and such oil used for infusion will be substantially tasteless and odorless and in the normal condition in which it is commonly available on the market for general use.

Other glyceride oils that may less desirably be treated in accordance with the present invention are the fish and fish liver oils including cod liver and halibut liver oils and also the animal oils.

In the treatment of these glyceride oils, this paste is added to and thoroughly dispersed in the glyceride oil in an amount of less than 25% and desirably in an amount of 15% or less.

The olive paste is mixed thoroughly throughout the body of the oil and agitated preferably for a period of one hour to two hours although shorter times may be used. Following the agitation treatment, the undissolved solids of the olives are removed as by filtration, centrifuging or similar means. Where the moisture content of the paste is sufficiently high to cause the oil to cloud or to interfere with filtration, a small amount of water absorbing filter aid may be added to the oil during infusion.

It is particularly desirable for the oil containing the paste thoroughly dispersed therein to be so thoroughly ground and so thoroughly agitated as to place the individual particles of the olive and drupe kernels in complete contact with the glyceride oil.

In addition to the treated oil taking on a most unusual enhanced olive oil flavor by this treatment, the stability and keeping quality of the treated oil is very materially enhanced and increased. Both the flavor characteristics and the keeping quality are greatly enhanced over the use of any variety of olives alone such as of the black ripe olive in salted and/or dehydrated condition or of green olives.

The olive paste containing the small proportion of drupe kernels should, after standing for 2 to 3 days, contain about between 50 and 400 p. p. m. of benzaldehyde and preferably between 100 and 200 p. p. m. of benzaldehyde.

The infused oil, after removal of the undissolved olive and drupe kernel solids, should contain between 5 and 75 p. p. m. of benzaldehyde and desirably between 15 and 45 p. p. m. of benzaldehyde.

Even though the combined olive and drupe kernel paste may develop a slight, almond like odor and flavor, the finished infused oil is free of any characteristic recognizable almond odor or flavor. At the same time, the olive odor and flavor in the infused oil are very substantially enhanced and improved as a result of the use of the small amount of drupe kernels in the olive paste.

Apparently, by reason of the bitterness and novel characteristics of the drupes, their inclusion in a small amount in the olive paste catalyzes the olive aroma and flavor in the final infused oil.

Where desired, the olive and drupe kernel paste may be subjected to an elevated temperature treatment and a portion of the drupe kernels may also be given a light roast before incorporation with the olive paste.

It has also been found possible for the drupe kernels to be prepared with water so as to release the desired proportion of benzaldehyde and then combined with the olive paste, with or without a heat treatment to prevent further hydrolysis.

Moreover, the glyceride oil may be infused separately with the olive paste prepared as heretofore referred to and separately infused with the ground or macerated drupe kernels which are treated with water to release the desired proportion of benzaldehyde.

In any event, the amount of benzaldehyde carried to the finished olive infused oil must not exceed about the 75 p. p. m. referred to above.

Where desired, the olive paste containing the bitter almonds or the bitter almonds alone may further be fortified with oil of bitter almonds or pure benzaldehyde or both.

The drupe kernels also appear to act as a catalyst to stabilize the development of flavor and odor even though the oil may have been infused substantially before the addition of the drupe kernels thereto and the drupe kernels, without giving their own characteristic flavor or odor to the oil, appear to develop and maintain in unaffected and enhanced condition the essential delicate olive aroma and flavor, the exact chemical constitution of which are not known.

It does not appear that the drupe kernels act as a negative oxidation catalyst nor do they appear to act as a flavoring constituent themselves because the characteristic "benzaldehyde" or almond odor and flavor are not noticeably present in the infused oil. On the other hand, the infused oil after treatment in accordance with the present invention has an enhanced and stable olive flavor so that the amount of olives used for infusion may be reduced from 25% to 50% while at the same time the infused glyceride oil acquires a superior odor and flavor.

In all cases, it is most important to add insufficient drupe kernels to give any benzaldehyde or almond-like flavor or odor to the oil since the almond flavor as a rule overcomes and destroys the olive flavor and odor characteristics which it is desired to enhance in the oil.

The olives used for infusion in a further embodiment may be in their green or unripe, bitter and substantially inedible condition. These unripe olives have a low olive oil content and contain less than 15% of oil, but when dehydrated and ground to a paste and used for infusion, appear to convey desirable flavor characteristics to the glyceride oil.

Although the present invention is particularly directed to the use of drupe kernels in combination with an olive infusion process, it has also been found to have a desirable application in connection with glyceride oil blends consisting of minor proportions of olive oil and major proportions of other refined glyceride oils such as corn oil, cottonseed oil, soya bean oil, peanut oil, sesame oil, etc.

These small amounts of drupe kernels may be used for infusion so as to give the infused oil a benzaldehyde content of preferably less than 45 parts per million and more than 5 parts per million.

The drupe kernels appear greatly to enhance and protect the olive oil flavor so that much smaller proportions of olive oil may be used for blending while at the same time retaining a desirable olive flavor in the finished blend.

Care must be exercised that the drupe kernels are added in an insufficient amount to give an almond or benzaldehyde odor or flavor.

The oil thus obtained and carrying the enhanced olive flavor and odor characteristics may be utilized either for salads and cooking purposes or in the manufacture of mayonnaise, salad dressings and French dressings. These manufactured products will take on a highly desirable flavor and odor characteristic that is not obtainable when using oils that have been prepared by the usual blending procedures.

Less preferably, and with less effective results, the drupe kernels may also be utilized for direct addition to the salad dressing, mayonnaise or French dressing, particularly where the oil used in manufacturing these products has been prepared with minor amounts of olives, olive pastes, and/or olive oil, the drupe kernels being added in amounts so as to give a benzaldehyde content of between 5 parts per million and 75 parts per million and desirably between 5 parts per million and 40 parts per million.

In addition to using the glyceride oils for infusion in accordance with the present invention, refined white mineral oil may similarly be infused and there will be imparted to the refined white mineral oil unusual flavor and odor characteristics where this olive and drupe kernel paste is used for infusion. Where it is desirable that the ground olives be first converted into paste form by the use of added oil, refined white mineral oil is desirably added to the olives or drupe kernels before, during and/or after grinding or macerating for this purpose.

The oil obtained as a result of the treatment with the drupe material is more fully disclosed and claimed in my copending application, Serial No. 400,651, filed July 1, 1941.

The present application is also a continuation in part of applications, Serial No. 365,209, filed November 12, 1940, No. 365,210 filed November 12, 1940, and No. 332,482 filed April 30, 1940, and through said applications continues in part the application which matured into patent 2,221,404 and which patent was continuing with the applications which matured into Patents 2,199,364 and 2,192,866.

Having described my invention, what I claim is:

1. A process of improving oils selected from the group consisting of the olive infused glyceride and refined white mineral oils and the olive oil blended glyceride oils so as to develop therein an enhanced olive flavor, which comprises treating said oils with a small amount of a ground drupe, and then filtering off the residue.

2. A process of improving oils selected from the group consisting of the olive infused glyceride and refined white mineral oils and the olive oil blended glyceride oils so as to develop therein an enhanced olive flavor, which comprises treating said oils with a small amount of bitter almond paste, and then filtering off the residue.

3. A process of improving glyceride oils so as to develop therein an enhanced olive flavor, which comprises infusing the said oils with a combination of an olive paste and a ground drupe, the drupe being present in an amount between 0.25% and 7.5% against the weight of the olive paste, and then filtering off the residue.

4. A process of improving oils selected from the group consisting of the olive infused glyceride and refined white mineral oils and the olive oil blended glyceride oils so as to develop therein an enhanced olive flavor, which comprises treating said oils with a small amount of a ground drupe, and then filtering off the residue, said oils containing from 5 to 75 parts per million of benzaldehyde after filtration of the residue.

5. A process of improving glyceride oils so as to develop therein an enhanced olive flavor, which comprises mixing said oils separately with a ground drupe and with salted, dehydrated, ripe olives, and filtering off the residues.

6. A process of improving glyceride oils so as to develop therein an enhanced olive flavor, which comprises treating said oils with salted, dehydrated, ripe olives containing a small amount of a drupe paste and filtering off the residue.

7. A process of improving olive infused glyceride oils so as to develop therein an enhanced olive flavor, which comprises treating said oils with a small amount of a ground drupe, and then filtering off the residue.

8. A process om improving olive oil blended glyceride oils so as to develop therein an enhanced olive flavor, which comprises treating said oils with a small amount of a ground drupe, and then filtering off the residue.

9. A process of improving refined white mineral oil so as to develop therein an enhanced olive flavor, which comprises treating said oil with salted, dehydrated, ripe olives containing a small amount of a drupe paste and filtering off the residue.

SIDNEY MUSHER.